United States Patent Office
3,450,710
Patented June 17, 1969

3,450,710
PROCESS FOR THE PREPARATION OF
NITROIMIDAZOLE CARBAMATES
Vincent F. Verdi, Edison, N.J., assignor to Merck & Co.,
Inc., Rahway, N.J., a corporation of New Jersey
No Drawing. Filed Jan. 6, 1967, Ser. No. 607,674
Int. Cl. C07d 49/36
U.S. Cl. 260—309     8 Claims

ABSTRACT OF THE DISCLOSURE

Nitroimidazole carbamates are prepared by reacting hydroxyalkyl nitroimidazoles with alkali metal cyanates in liquid hydrogen fluoride. The nitroimidazole carbamates prepared by the process of this invention are useful in the treatment of protozoal diseases.

Cross reference to related applications

The 2-carbamoyloxyalkyl-4(5)-nitroimidazoles produced by the process of this invention can be converted to the corresponding 1-methyl compounds by procedures described in the copending application of Kollonitsch, Chemerda, and Marburg, Ser. No. 607,672 filed Jan. 6, 1967.

Background of invention

This invention is concerned with processes for the preparation of certain nitroimidazole carbamates which exhibit antiparasitic activity or can be used as intermediates in the preparation of active carbamates.

Summary of the invention

The object of the present invention is to provide an improved method suitable for producing nitroimidazole carbamates by reacting hydroxyalkyl nitroimidazoles with an alkali metal cyanate in liquid hydrogen fluoride.

The 1-methyl nitroimidazole carbamates produced by the processes of the present invention are active antiparasites effective against the causative organisms of the protozoal parasitic diseases, trichomoniasis and enterohepatitis; the latter being a disease occurring in turkeys which is caused by the protozoan parasite *Histomonas meleagridis*.

Description of the preferred embodiments

In accordance with this invention, it is found that 2-hydroxy lower alkyl nitroimidazoles can be converted to the corresponding carbamates by reacting such nitroimidazoles with an alkali metal cyanate in liquid hydrogen fluoride.

Pursuant to preferred embodiments of this invention, nitroimidazoles of the formula

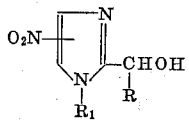

wherein R represents lower alkyl or hydrogen and $R_1$ represents methyl or hydrogen, are reacted with an alkali metal cyanate in liquid hydrogen fluoride to produce a carbamate of the formula

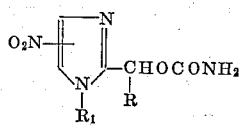

In carrying out the process of this invention, the starting compound is dissolved in liquid hydrogen fluoride and an alkali metal cyanate is added to the resulting solution. The resulting reaction mixture is then stirred at a temperature below about 30° C. for sufficient time to complete the reaction.

After the reaction is complete, the carbamate is conveniently recovered by evaporating the hydrogen fluoride and quenching the resulting residue in water. Alternatively, the residue after evaporation of the hydrogen fluoride, can be extracted with a suitable solvent for the carbamate and the extracts evaporated to obtain the desired carbamate.

EXAMPLE 1

To about 12 ml. of liquid hydrogen fluoride in a polyethylene reactor is added 3.1 g. of 1-methyl-2-hydroxymethyl-5-nitroimidazole in small portions while stirring and cooling in a carbon dioxide-acetone bath. Potassium cyanate (1.78 g.) is then added to the clear solution while cooling the reaction medium in an ice bath. The resulting reaction mixture is stirred overnight during which time the temperature is allowed to rise to about 25° C. After this reaction period, the hydrogen fluoride is removed by passing in a stream of nitrogen through the reaction mixture and warming it with a warm water bath. After most of the hydrogen fluoride is removed, the residue is quenched by adding 10 ml. of water while cooling the reaction vessel in an ice bath. The stirring is continued for about 1½ hours, whereupon the solid product separates, is filtered off, washed with cold water, and dried in vacuo to yield 1-methyl-5-nitroimidazol-2-ylmethyl carbamate melting at 168–169° C.

EXAMPLE 2

When the process of Example 1 is repeated using 1-methyl-2-(1'-hydroxyethyl)-5-nitroimidazole as the starting material, 1-(1'-methyl-5'-nitroimidazol-2'-yl)-ethyl carbamate melting at 156–158° C. is obtained.

EXAMPLE 3

A polyethylene reactor fitted with a magnetic stirring bar, a nitrogen inlet and outlet and HF inlet is cooled to −80° C. and under a gentle flow of nitrogen is charged with 25 ml. liquid anhydrous hydrogen fluoride. Then 1.32 g. of 2-hydroxymethyl-4(5)-nitroimidazole is added in small portions while stirring and cooling. After completion of this addition, 0.800 g. potassium cyanate in small portions with stirring and cooling is added. The resulting homogeneous solution is allowed to warm to room temperature and the HF evaporated by passing in nitrogen stream overnight. The residue is extracted with 3×20 ml. of anhydrous ethanol. This alcoholic solution is concentrated to dryness to yield 2-carbamoyloxymethyl-4(5)-nitroimidazole. This product is recrystallized from acetonitrile to yield product melting at 180–181° C.

EXAMPLE 4

When the process of Example 3 is repeated using 2-(1'-hydroxyethyl)-4(5)-nitroimidazole as the starting material, 1-[4'(5')-nitroimidazol-2'-yl]-ethyl carbamate is obtained.

The 2-hydroxymethyl-4(5)-nitroimidazole used as the starting material in Example 3 can be prepared as follows:

83.0 grams (0.864 mole) of 2-hydroxymethyl imidazole is dissolved in 200 ml. of acetic anhydride. The solution is allowed to stand overnight at room temperature. The acetate salt of 2-acetoxymethyl imidazole crystallizes. The crystalline solid is slurried well with ether, filtered, and the crystals are washed with ether until the odor of acetic acid is no longer detectable.

176.6 grams (0.882 mole) of 2-acetoxymethyl imidazole acid salt is added in small amounts of 165 ml. of cold, fuming 90% nitric acid. This solution is added slowly with stirring and cooling to 150 ml. of cold, fuming 90% nitric acid containing 90.1 g. of gaseous $BF_3$. The reaction mixture is heated on the steam cone for 5 hours.

After cooling to room temperature, the reaction mixture is poured over ice an neutralized with sodium hydroxide. The resulting solution is then extracted with ethyl acetate and the ethyl acetate extracts evaporated in vacuo to dryness. The residue is refluxed for 1 hour in a solution of 100 ml. of 2.5 N sodium hydroxide and 100 ml. of methanol. The solution is then neutralized with hydrochloric acid and extracted with ethyl acetate. The extracts are evaporated to dryness, dissolved in methanol, and chromatographed over charcoal.

Elution of the charcoal with 50% ether-acetone first removes a small amount of imidazole-2-carboxaldehyde. The next substance eluted is 2-hydroxymethy-4(5)-nitroimidazole. After recrystallization from acetone, the product melts at 156–158° C.

The 2-(1'hydroxyethyl)-4(5)-nitroimidazole used as the starting material in Example 4 can be prepared in accordance with procedures described in the copending application of Kollonitsch and Scott, Ser. No. 607,642 filed Jan. 6, 1967. This procedure is as follows:

24 grams (0.25 mole) of 2-ethylimidazole is dissolved in a mixture of 29 ml. of concentrated sulfuric acid and 29 ml. of 20% fuming sulfuric acid in a quartz flask. The resulting mixture is irradiated with two 450 watt mercury lamps and a rapid stream of chlorine is passed through the irradiated solution at a temperature below about 60° C. for about 35 minutes. The composition of the imidazoles in the resulting chlorinated solution as determined by NMR showed the main product to be 2-(1'-chloroethyl)-imidazole.

The solution of the chlorinated imidazoles is added dropwise with good stirring to a mixture of 44 ml. of 65% fuming sulfuric acid and 16.5 ml. of red fuming nitric acid; the mixture being cooled in an ice-water bath. After the addition of the chlorinated imidazole is complete, the mixture is stirred at room temperature for one-half hour and is finally heated in a water bath at 50–60° C. for 2 hours. The nitration is shown to be complete by NMR determination of the product which shows that the aromatic proton peak had half the area of that of the starting solution and is shifted downfield.

A portion (14 ml. equivalent to 0.024 mole of imidazole) of the nitration mixture is added slowly with good stirring to 100 g. of ice. The resulting mixture contains oily imidazoles in suspension which are extracted with 3× 15 ml. of ethyl acetate. The ethyl acetate extracts are evaporated to a yellow syrup which is dissolved in 40 ml. of hot water and heated on the steam bath to selectively hydrolyze the α-chloroethyl imidazoles. The solution is cooled slowly to 5° C. causing the 2-(2'-chloroethyl)-4(5)-nitroimidazole to separate as crystalline needles.

The resulting mother liquors are shown by NMR to contain about 85% 2-(1'-hydroxyethyl)-4(5)-nitroimidazole. The solution is adjusted to pH 3 with ammonium hydroxide and extracted with 4× 10 ml. of ethyl acetate. The extracts are evaporated to a syrup which is dissolved in a hot mixture of chloroform and acetone (1:1). When this solution is cooled, crystalline 2-(1'-hydroxyethyl)-4(5)-nitroimidazole precipitates which after recrystallization from a mixture of chloroform and acetone is found to melt at 145–152° C. on the microscope hot stage.

The 1-methyl-2-hydroxymethyl-5-nitroimidazole used as the starting material in Example 1 can be prepared as follows:

83.0 grams (0.864 mole) of 2-hydroxymethyl imidazole is dissolved in 200 ml. of acetic anhydride. The solution is allowed to stand overnight at room temperature. The acetate salt of 2-acetoxymethyl imidazole crystallizes. The crystalline solid is slurried well with ether, filtered, and the crystals are washed with ether until the odor of acetic acid is no longer detectable.

176.6 grams, (0.882 mole) of 2-acetoxymethyl imidazole acetic acid salt is added in small amounts to 165 ml. of cold, fuming 90% nitric acid. This solution is added slowly with stirring and cooling to 150 ml. of cold, fuming 90% nitric acid containing 90.1 g. of gaseous $BF_3$. The reaction mixture is heated on the steam cone for 5 hours.

After cooling to room temperature, the reaction mixture is poured over ice and neutralized with sodium hydroxide. The resulting solution is then extracted with ethyl acetate and the ethyl acetate extracts evaporated in vacuo to dryness. The residue is refluxed for 1 hour in a solution of 100 ml. of 2.5 N sodium hydroxide and 100 ml. of methanol. The solution is then neutralized with hydrochloric acid and extracted with ethyl acetate. The extracts are evaporated to dryness, dissolved in methanol. and chromatographed over charcoal.

Elution of the charcoal with 50% ether-acetone first removes a small amount of imidazole-2-carboxaldehyde. The next substance eluted is 2-hydroxymethyl-4(5)-nitroimidazole. After recrystallization from acetone, this melts at 156–158° C.

12.6 grams of dimethyl sulfate is added to 11.1 g. of 2-hydroxymethyl-4(5)-nitroimidazole and the mass thoroughly mixed. The mass is then heated on the steam cone for 2 hours and cooled to room temperature.

A small amount of ice is added and the remaining dimethyl sulfate and methyl hydrogen sulfate neutralized by slow addition of concentrated ammonium hydroxide. The resulting solution is extracted with chloroform. The chloroform extracts are separated and evaporated to dryness to yield a residue consisting of 1-methyl-2-hydroxymethyl-5-nitroimidazole. Recrystallization from acetone affords substantially pure 1-methyl-2-hydroxymethyl-5-nitroimidazole, M.P. 117–119° C.

The 1-methyl-2-(1'-hydroxyethyl)-5-nitroimidazole used as the starting material in Example 2 can be prepared as follows:

A solution of methyl magnesium iodide is prepared from 4.5 g. of magnesium, 26.3 g. of methyl iodide and 90 ml. of diethyl ether. 2.8 mg. of this solution is diluted with 15 ml. of ether and added to a solution of 0.5 g. of 1-methyl-2-formyl-5-nitroimidazole in 20 ml. of diethyl ether. The mixture is refluxed for 20 minutes. An additional 15 ml. of diethyl ether is then added followed by 6.7 ml. of 0.5 N hydrochloric acid. The organic phase is separated, dried over sodium sulfate, and evaporated to dryness in vacuo to give 0.27 g. of 1-methyl-2-(1'-hydroxyethyl)-5-nitroimidazole. This material is dissolved in ether, an equal volume of petroleum ether added, and the resulting solution evaporated to give crystalline 1-methyl-2-(1'-hydroxyethyl)-5-nitroimidazole.

The acidic aqueous layer is extracted with an equal volume of methylene chloride. The methylene chloride solution is evaporated to a residue which is dissolved in a minimum volume of methylene chloride. One-half volume of petroleum ether is added and the solution evaporated to give a residue of 1-methyl-2-(1'-hydroxyethyl)-5-nitroimidazole.

The solid products obtained are combined and dissolved in ethyl acetate. The solution is filtered through acid-washed alumina and the filtrate evaporated to a small volume. 1-methyl-2-(1'-hydroxyethyl)-5-nitroimidazole crystallizes; M.P. 144–145° C. It is recrystallized from ethyl acetate to give pure 1-methyl-2-(1'-hydroxyethyl)-5-nitroimidazole; M.P. 145–147° C.

What is claimed is:

1. The process which comprises reacting a 2-hydroxy lower alkylidene-4(5) nitroimidazole with an alkali metal cyanate in liquid hydrogen fluoride to produce the corresponding nitroimidazol-2-yl lower alkyl carbamate.

2. The process of claim 1 which comprises reacting a compound of the formula

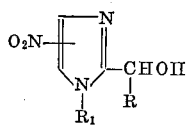

wherein R is hydrogen or lower alkyl and $R_1$ is hydrogen or methyl with an alkali metal cyanate in liquid hydrogen fluoride to produce a compound of the formula

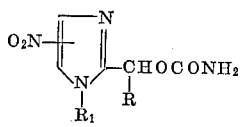

wherein R and $R_1$ are the same as above.

3. The process of claim 1 in which a compound of the formula

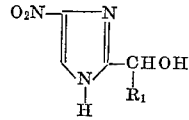

wherein $R_1$ is hydrogen or lower alkyl is reacted with an alkali metal cyanate in liquid hydrogen fluoride to produce a compound of the formula

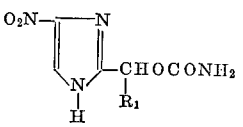

4. The process of claim 1 in which a compound of the formula

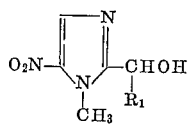

wherein $R_1$ is hydrogen or lower alkyl is reacted with an alkali metal cyanate in liquid hydrogen fluoride to produce a compound of the formula

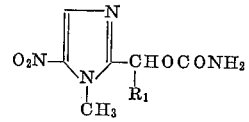

5. The process of claim 1 wherein the starting material is 1-methyl-2-hydroxymethyl-5-nitroimidazole.

6. The process of claim 1 wherein the starting material is 1-methyl-2-(1'-hydroxyethyl)-5-nitroimidazole.

7. The process of claim 1 wherein the starting material is 2-hydroxymethyl-4(5)-nitroimidazole.

8. The process of claim 1 wherein the starting material is 2-(1'-hydroxyethyl)-4(5)-nitroimidazole.

References Cited

UNITED STATES PATENTS

| | | |
|---|---|---|
| 2,814,637 | 11/1957 | Marshall et al. |
| 2,878,158 | 3/1959 | Stuehmer et al. |
| 3,103,533 | 9/1963 | Youngdale. |

OTHER REFERENCES

Loev et al., Jour. Org. Chem., vol. 28, pp. 3421–6 (1963).

HENRY R. JILES, *Primary Examiner.*

NATALIE TROUSOF, *Assistant Examiner.*

U.S. Cl. X.R.

260—999